US012786161B2

(12) United States Patent
Ajmera et al.

(10) Patent No.: US 12,786,161 B2
(45) Date of Patent: Nov. 3, 2026

(54) DISTRIBUTED REVERSE INDEXING OF NETWORK FLOW LOGS IN A FABRIC COMPOSED OF DPUS

(71) Applicant: Advanced Micro Devices, Inc., Santa Clara, CA (US)

(72) Inventors: Shrey Ajmera, Santa Clara, CA (US); Enrico Schiattarella, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/380,621

(22) Filed: Oct. 16, 2023

(65) Prior Publication Data

US 2025/0126096 A1 Apr. 17, 2025

(51) Int. Cl.

| | |
|---|---|
| ***H04L 43/062*** | (2022.01) |
| ***H04L 9/40*** | (2022.01) |
| ***H04L 43/026*** | (2022.01) |
| ***H04L 45/655*** | (2022.01) |
| *G06F 11/30* | (2006.01) |
| *G06F 11/34* | (2006.01) |
| *G06F 16/22* | (2019.01) |
| *G06F 16/245* | (2019.01) |
| *G06F 16/28* | (2019.01) |
| *H04L 41/0631* | (2022.01) |
| *H04L 43/08* | (2022.01) |
| *H04L 43/087* | (2022.01) |

(52) U.S. Cl.

CPC .............. *H04L 63/02* (2013.01); *G06F 11/30* (2013.01); *G06F 11/34* (2013.01); *G06F 16/22* (2019.01); *G06F 16/245* (2019.01); *G06F 16/28* (2019.01); *H04L 41/0631* (2013.01); *H04L 43/026* (2013.01); *H04L 43/062* (2013.01); *H04L 43/08* (2013.01); *H04L 43/087* (2013.01); *H04L 45/655* (2022.05)

(58) Field of Classification Search

CPC ........... H04L 45/655; H04L 2012/5697; H04L 43/026; H04L 63/02; H04L 41/0631; H04L 43/062; H04L 43/08; H04L 43/087; G06F 16/245; G06F 16/22; G06F 16/28; G06F 11/30; G06F 11/34

See application file for complete search history.

(56) References Cited

U.S. PATENT DOCUMENTS

| | | | | |
|---|---|---|---|---|
| 9,507,848 | B1 * | 11/2016 | Li | G06F 16/81 |
| 10,073,630 | B2 * | 9/2018 | Yang | G06F 3/0638 |
| 10,838,931 | B1 * | 11/2020 | Spiegel | G06F 16/2228 |
| 10,862,796 | B1 * | 12/2020 | Dickinson | H04L 45/64 |
| 11,290,355 | B1 | 3/2022 | Ramaswamy et al. | |
| 11,392,578 | B1 * | 7/2022 | James | G06F 16/24573 |

(Continued)

*Primary Examiner* — Umar Cheema
*Assistant Examiner* — Adam A Cooney
(74) *Attorney, Agent, or Firm* — Patterson + Sheridan, LLP

(57) ABSTRACT

Rather than collecting flow logs at a central location, and then processing these flow logs to create general purpose or specialized data stores, the embodiments herein rely on the network appliances to create the flow logs and metadata that indexes these flow logs. The flow logs and the metadata can then be collected at the central location (e.g., a central analyzer) and merged with flow logs and metadata generated by other network appliances to yield a data store that can be used to analyze the flow logs in computing environment (e.g., a data center).

13 Claims, 7 Drawing Sheets

(56) References Cited

U.S. PATENT DOCUMENTS

| | | | | |
|---|---|---|---|---|
| 11,843,622 | B1 * | 12/2023 | Tellez | H04L 63/1425 |
| 11,853,254 | B1 * | 12/2023 | Sommers | G06F 15/1735 |
| 11,914,566 | B2 * | 2/2024 | Fink | G06F 16/1734 |
| 2005/0286423 | A1 * | 12/2005 | Poletto | H04L 63/1425 370/235 |
| 2009/0141638 | A1 * | 6/2009 | Dolisy | H04L 43/026 370/241 |
| 2010/0070647 | A1 * | 3/2010 | Irino | H04L 41/04 709/234 |
| 2017/0177636 | A1 * | 6/2017 | Nguyen | G06F 16/2264 |
| 2017/0373953 | A1 * | 12/2017 | George | H04L 43/04 |
| 2019/0007313 | A1 * | 1/2019 | Clemm | H04L 45/38 |
| 2019/0373052 | A1 * | 12/2019 | Pollitt | G06F 9/5072 |
| 2021/0152445 | A1 * | 5/2021 | Hughes | H04L 43/067 |
| 2022/0129468 | A1 * | 4/2022 | Su | G06F 3/067 |
| 2022/0166722 | A1 * | 5/2022 | Dave | H04L 45/50 |
| 2022/0247647 | A1 * | 8/2022 | Brockbank | H04L 43/0811 |
| 2022/0327123 | A1 * | 10/2022 | Ajmera | G06F 11/3476 |
| 2022/0335008 | A1 * | 10/2022 | Ajmera | G06F 16/148 |
| 2023/0040539 | A1 * | 2/2023 | Lee | G06F 11/3476 |
| 2023/0115935 | A1 * | 4/2023 | Wahbo | H04L 63/1425 726/23 |
| 2023/0327968 | A1 * | 10/2023 | Zhang | H04L 43/0817 709/224 |

* cited by examiner

DISTRIBUTED REVERSE INDEXING OF NETWORK FLOW LOGS IN A FABRIC COMPOSED OF DPUS

TECHNICAL FIELD

Examples of the present disclosure generally relate to generating metadata regarding flow logs within network appliances.

BACKGROUND

Flow log databases store a record of network traffic processing events that occur on a computer network. For example, the network appliances providing network services for a network can create a log entry for each network packet received and for each network packet transmitted. Flow log databases in data centers can be extremely large due to the immense amount of network traffic. General purpose databases have been used for the flow log databases in some large data centers.

Network traffic flow logs have proven useful in monitoring computer networks, detecting network traffic patterns, detecting anomalies such as compromised (hacked) systems, and for other purposes. Network traffic, however, is increasing. Data centers in particular have enormous amounts of network traffic. Per device flow logs typically are collected, processed and stored in general purpose data stores. While specialized data stores have been developed that more efficiently provides searchable logs of network traffic, all these techniques rely on generating and collecting flow logs at a central location.

SUMMARY

One embodiment described herein is a network appliance that include circuitry configured to generate flow logs describing operation of the network appliance, generate metadata that indexes the flow logs, and transmit the flow logs and the metadata to a central analyzer configured to merge the flow logs and the metadata with flow logs and metadata received from a plurality of network appliances.

One embodiment described herein is a central analyzer that includes one or more processor and memory storing an application that is configured to perform an operation. The operation includes receiving flow logs and metadata from each of a plurality of network appliances, wherein the metadata indexes the flow logs, merging the metadata from the plurality of network appliances, and merging the flow logs from the plurality of network appliances, wherein the merged metadata and the merged flow logs are part of a searchable flow log database.

One embodiment described herein is a method that includes generating, at a network appliance, flow logs describing operation of the network appliance, generating, at the network appliance, metadata that indexes the flow logs, and transmitting the flow logs and the metadata from the network appliance to a central analyzer that merges the flow logs and the metadata with flow logs and metadata received from a plurality of network appliances.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
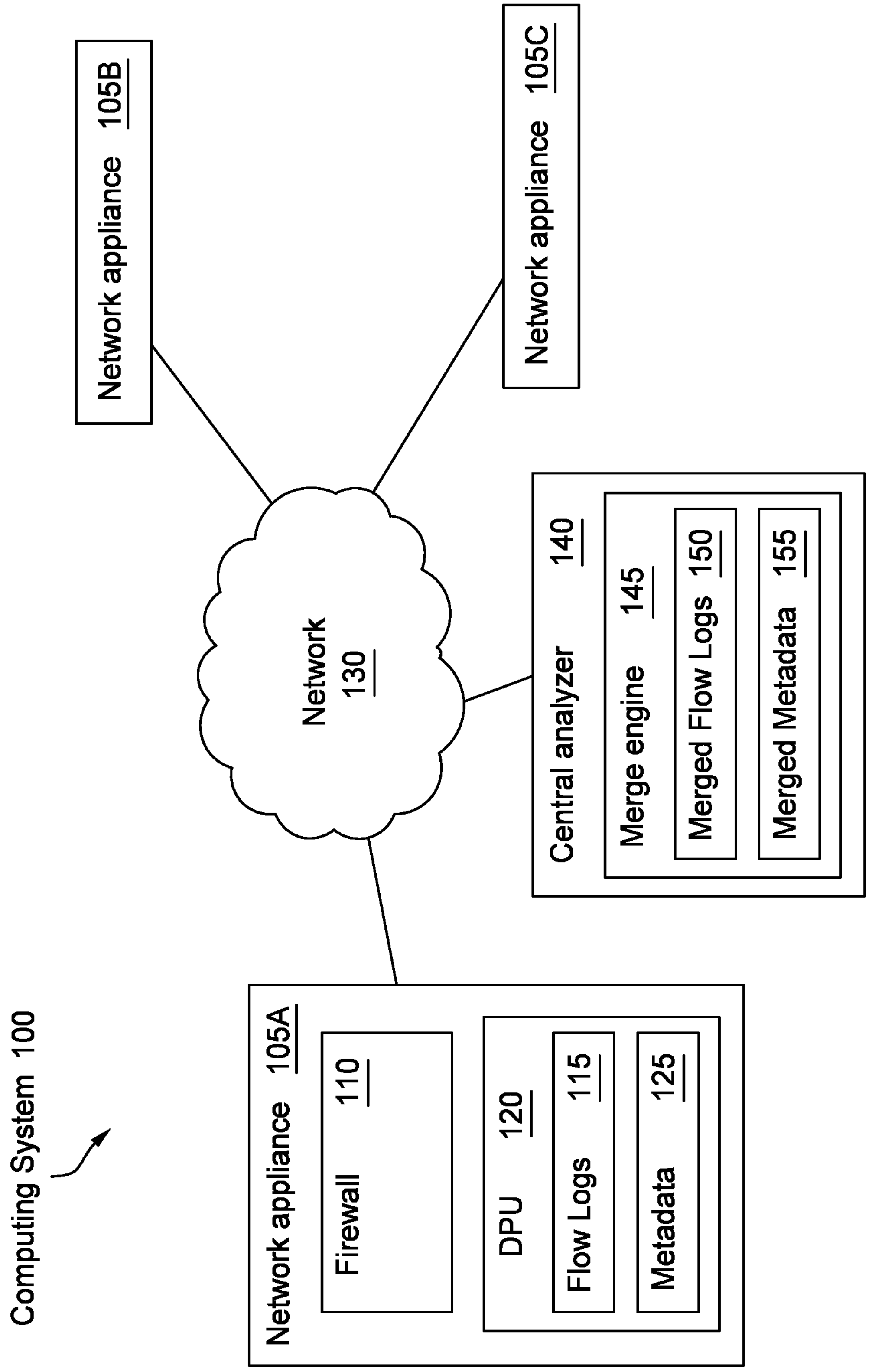
FIG. 1 illustrates a block diagram of a computing system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Rather than collecting flow logs at a central location, and then processing these flow logs to create general purpose or specialized data stores, the embodiments herein rely on the network appliances (e.g., routers, switches, and network interface controllers or cards (NICs)) that are generating the flow logs to create metadata that indexes these flow logs. The flow logs and the metadata can then be collected at the central location and merged in an efficient manner to yield a data store that can be used to analyze the flow logs.

Advantageously, generating the metadata at the network appliances can save significant computer resources relative to generating the metadata at a central analyzer. For example, the network appliances can have data processing units (DPUs) that can efficiently generate the metadata (e.g., indices). These DPUs are not typically used to perform analytics on flow logs but are well suited for the task. As such, the metadata can be generated using much less compute resources in the network appliances compared to the amount of compute resources needed to generate the metadata in a central analyzer.

Further, the metadata can be generated concurrently in the network appliances in the computing system (e.g., the data center). That is, rather than the central analyzer having to process one batch of flow logs at a time, the flow logs can be processed concurrently on the network appliances which can reduce the time until a data store generated from the metadata is ready to be searched. After receiving the logs and flow data, the central analyzer can perform a block merge on the data rather than having to combine the metadata and flow logs row-by-row.

FIG. 1 illustrates a block diagram of a computing system 100, according to an example. The computing system 100 (e.g., a data center) includes network appliances 105, which can be routers, switches, NICs, and the like. Each of the network appliances 105 include a firewall 110 which generates flow logs 115. For example, when the firewall 110 permits a connection to be made, it can generate the flow logs 115 to describe the connection, such as IP addresses, the number of packets transferred, the policy that permitted the connection, and the like. In one embodiment, the firewall 110 may also generate a flow log when a connection is denied which contains, for example, the reason it was denied and which IP address requested the connection. While the embodiments herein describe generating flow logs 115 to track the operation of the firewall 110, flow logs 115 can be generated for other functions in the network appliance 105. Thus, the embodiments herein are not limited to flow logs 115 generated by a firewall 110.

Some fields in a log entry of the flow logs 115 can include, but are not limited to: source virtual routing and forwarding (svrf), destination virtual routing and forwarding (dvrf), source IP address (sip), destination IP address (dip), timestamp, source port (sport), destination port (dport), protocol, action, direction, rule identifier (ruleid), session identifier (sessionid), session state, ICMP type (icmptype), ICMP identifier (icmpid), ICMP code (icmpcode), application identifier (appid), forward flow bytes (iflowbytes), and reverse flow bytes (rflowbytes). A log entry based on the foregoing definition could be {65, 65, 10.0.1.5, 192.168.5.50, 100, 100, TCP, allow, from-host, 1000, 1000, dummy, 1, 1, 1, 100, 1050, 124578}.

The circuitry in the network appliances 105 also include one or more DPUs 120. In one embodiment, the DPU 120 is a programmable processor designed to efficiently handle data-centric workloads such as data transfer, reduction, security, compression, analytics, and encryption, at scale in data centers. The DPU 120 can improve the efficiency and performance of data centers by offloading workloads from the central processing unit (CPU). The DPU 120 can communicate with CPUs and graphic processing units (GPUs) to enhance computing power and the handling of complex data workloads. Each DPU 120 can include a plurality of processing cores. In one embodiment, the DPUs 120 are fully programmable P4 DPUs.

In this example, the DPUs 120 in each of the network appliances 105 generate metadata 125 from the flow logs. In one embodiment, the same DPU 120 that generates the flow logs 115 also generates the metadata 125 for the flow logs 115, although it is possible that one DPU in the network appliance 105 generates the flow logs 115 while another DPU in the same network appliance 105 generates the metadata 125.

In one embodiment, the metadata 125 includes indices that index into the "raw" flow logs 115. For example, the indices may indicate where different types of data is found in the flow logs 115. In one embodiment, the metadata 125 can make the flow logs 115 searchable (e.g., to identify flow logs containing a particular IP address). In one embodiment, the indices in the metadata 125 are reverse indices. Reverse indexing means to index a document against the words present in that document. For example, the statement "My name is joe smith" can be reverse indexed against words "joe" and "smith", so that if user tries to search for the documents that contain the words "joe" or "smith" or both, then the system returns the documents that have those words. The details for creating these indices are described in more detail below. However, the embodiments herein are not limited to a particular type of indexing algorithm, so long as the algorithm generates indices that can be merged to create a data store for the flow logs.

In addition to the network appliances 105, the computing system 100 includes a network 130 and a central analyzer 140. The network 130 interconnects the network appliances 105 to each other and to the central analyzer 140. In one embodiment, the network appliances 105 can be considered as part of the network 130.

The central analyzer 140 (e.g., a computing system which can include one or more processors and memory) includes a merge engine 145 which can be software, hardware, or combinations thereof that merges the flow logs 115 and metadata 125 received from the various network appliances 105 in the computing system 100. For example, the network appliances 105 may send their flow logs 115 and metadata 125 to the same central analyzer 140. The merge engine 145 can then merge the flow logs to generate the merged flow logs 150 and merge the metadata to generate the merged metadata 155. The merged flow logs 150 and merged metadata 155 can be stored in a data store in the central analyzer (or some other location), which then can be used by a system administrator or customer to analyze the flow logs.

Figure 2:
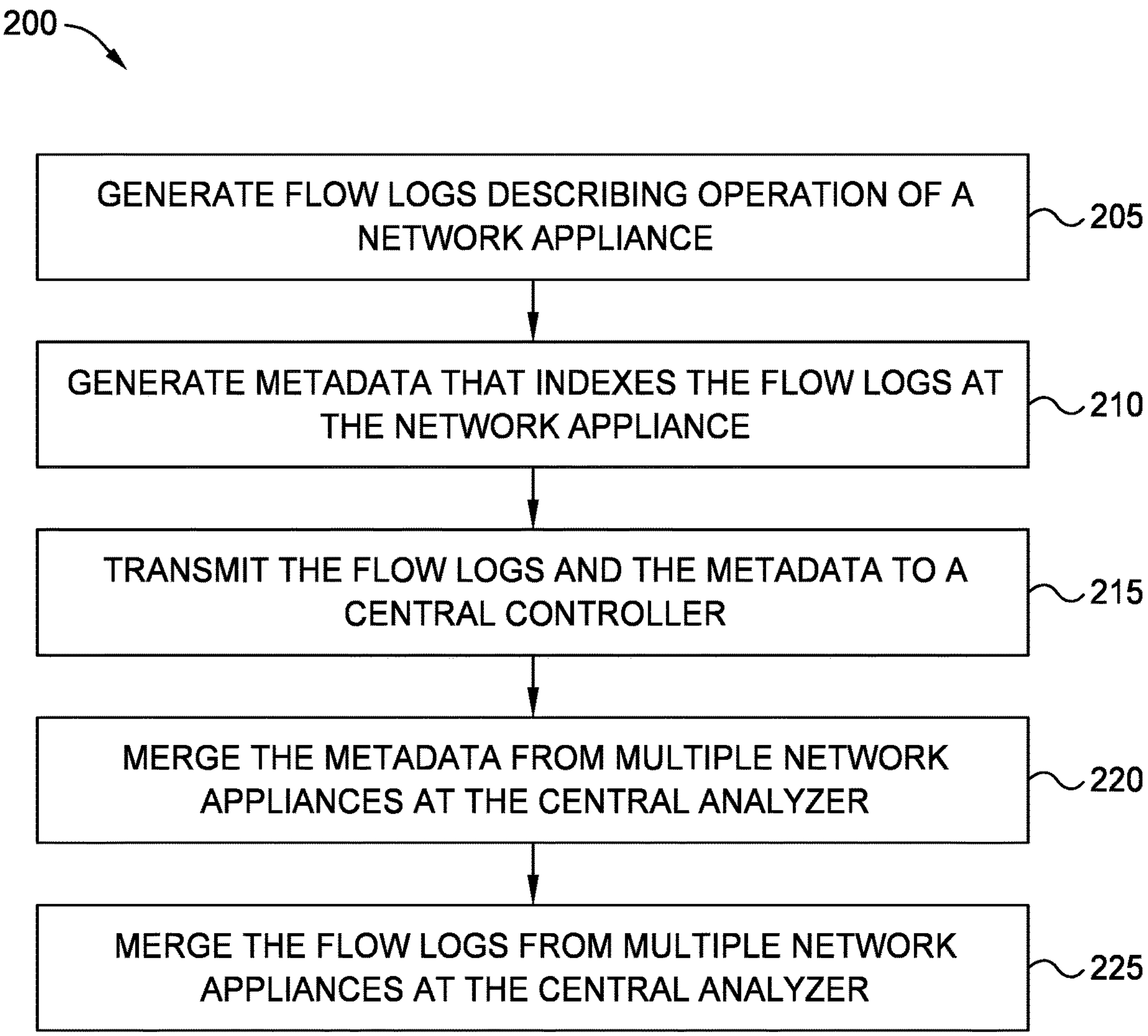
FIG. 2 is a flowchart for generating metadata for flow logs at network devices, according to an example.

FIG. 2 is a flowchart of a method 200 for generating metadata for flow logs at network devices, according to an example. At block 205, the network appliance (or a DPU in the network appliance) generates flow logs describing one or more operations of the network appliance. The network flows can be generated whenever packets are transmitted or received by the network appliance. This can include data corresponding to a firewall or some other operation.

At block 210, the network appliance (or a DPU in the network appliance) generates metadata that indexes the flow logs at the network appliance. In one embodiment, the same DPU that generates the flow logs also generates the metadata, although this is not a requirement.

In one embodiment, the metadata includes indices that point to different data fields in the flow logs. In an example, the indices are self-reverse indices. Examples of self-reverse indices are discussed in more detail in FIGS. 3-5.

After generating the indices, at block 215 the network appliance transmits the flow logs and the metadata to the central analyzer. While the network appliance can transmit the data separately, in one embodiment, the network appliance transmits the flow logs and the metadata in the same file. For example, the network appliance can package the flow logs and the metadata together in a self-reverse indexed binary file that contains both the raw flow logs and the reverse indices.

At block 220, the central analyzer merges the metadata from multiple network appliances. For example, the central analyzer may merge the metadata received from every network appliance (e.g., every switch, router, or NIC) in a data center together. In one embodiment, the central analyzer merges blocks (which can include multiple rows) of metadata received from different network appliances together rather than performing a row-by-row merge of the data.

At block 225, the central analyzer merges the flow logs from multiple network appliances. In one embodiment, the central analyzer merges blocks of flow logs received from different network appliances together rather than performing a row-by-row merge of the data.

The central analyzer can merge the metadata and the flow logs separately, or can merge files received from the network appliances that contain both the raw log files and the metadata. As an example of the latter, the central analyzer can merge the self-reverse indexed files received from multiple network appliances into a single instance of a larger self-reverse indexed file, which can serve as a searchable flow log database.

For example, a log object (or the flow log database object) is the result of the indexing done locally at the DPU at block 210, then the DPU uploads the log object to the object store in central analyzer. Once in central analyzer, its merge algorithm merges various such flow log databases (e.g., at block 225) into a large/merged flow log database periodically and stores the merged database again in the object store.

Figure 3:
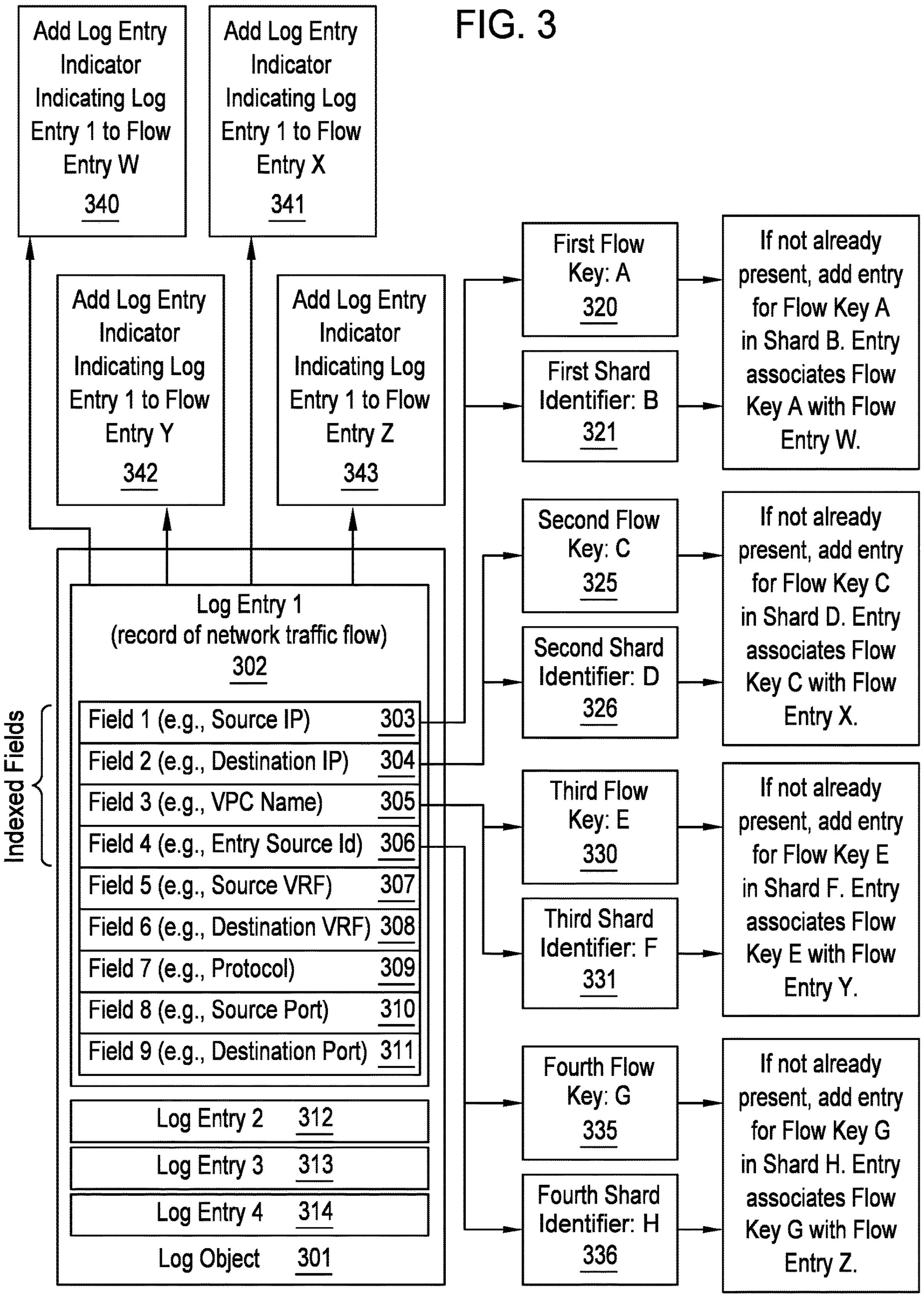
FIG. 3 is a high-level diagram illustrating processing of a log object, according to an example.

FIG. 3 is a high-level diagram illustrating processing of a log object 301 that, according to some aspects. The log object 301 is one example of entries of the flow logs 115 described in FIG. 1. Each network appliance (or DPUs in the network appliances) can generate the log object 301 in FIG. 3. That is, the log object 301 include both the "raw" flow logs before it is processed to generate the metadata.

The log object 301 includes log entries in the flow logs 115 shown in FIG. 1, such as a first log entry 302, a second log entry 312, a third log entry 313, and a fourth log entry 314. These log entries can correspond to different events in the network appliance (e.g., each time the firewall approves a connection). The first log entry 302 is illustrated as a flow log entry generated by a network appliance. The first flow log entry 302 includes data fields such as a first field 303, a second field 304, a third field 305, a fourth field 306, a fifth field 307, a sixth field 308, a seventh field 309, an eighth field 310, and a ninth field 311.

The first field 303 can contain a value indicating the source IP address of a network packet. The second field 304 can contain a value indicating the destination IP address of the network packet. The third field 305 can contain a value indicating the virtual private cloud tag of the network packet. The fourth field 306 can contain a value indicating the entry source Id of the network packet. The fifth field 307 can contain a value indicating the source virtual routing and forwarding (VRF) identifier of the network packet. The sixth field 308 can contain a value indicating the destination VRF identifier of the network packet. The seventh field 309 can contain a value indicating the protocol (e.g., layer 4 protocol) of the network packet. The eighth field 310 can contain a value indicating the source port of the network packet. The ninth field 311 can contain a value indicating the destination port of the network packet.

Some of the data fields are indexed fields that include indexed field values. FIG. 3 shows that the indexed fields are the first field 303, the second field 304, the third field 305, and the fourth field 306. In a non-limiting example, the first field is an indexed field containing the indexed field value 192.168.1.1 while the second field is an indexed field containing the indexed field value 10.0.0.1. Each of the indexed fields can be used to determine a shard identifier and a flow key. Flow keys, shard identifiers, and other values may be determined via a hashing algorithm (e.g., CRC 32), via a lookup table, or using some other technique. Note: a modulo 64 operation can produce a shard identifier in the range 0-63.

The first log entry 302 can be added (e.g., appended) to the flow object. As such, the first log entry's location is known. For the first field value, a log entry indicator indicating the first log entry's location is added to flow entry "W" in the flow table 340. The first field value 303 can be used to determine flow key "A" 320, and shard identifier "B" 321. If not already present, an entry for flow key "A" can be added to shard "B". The shard entry associates flow key "A" with flow entry "W". For the second field value, a log entry indicator indicating the first log entry's location is added to flow entry "X" in the flow table 341. The second field value 304 can be used to determine flow key "C" 325, and shard identifier "D" 326. If not already present, an entry for flow key "C" can be added to shard "D". The shard entry associates flow key "C" with flow entry "X". For the third field value, a log entry indicator indicating the first log entry's location is added to flow entry "Y" in the flow table 342. The third field value 305 can be used to determine flow key "E" 330, and shard identifier "F" 331. If not already present, an entry for flow key "E" can be added to shard "F". The shard entry associates flow key "E" with flow entry "Y". For the fourth field value, a log entry indicator indicating the first log entry's location is added to flow entry "Z" in the flow table 343. The fourth field value 306 can be used to determine flow key "G" 335, and shard identifier "H" 336. If not already present, an entry for flow key "G" can be added to shard "H". The shard entry associates flow key "G" with flow entry "Z".

FIG. 3 illustrates an example having four indexed fields. It is understood that in practice more or fewer indexed fields may be used. Another example, that has been under test, has the following indexed fields: source IP, destination IP, the dyad <source IP, destination IP>, network appliance identifier, virtual private cloud name, source port, destination port, and protocol.

Figure 4:
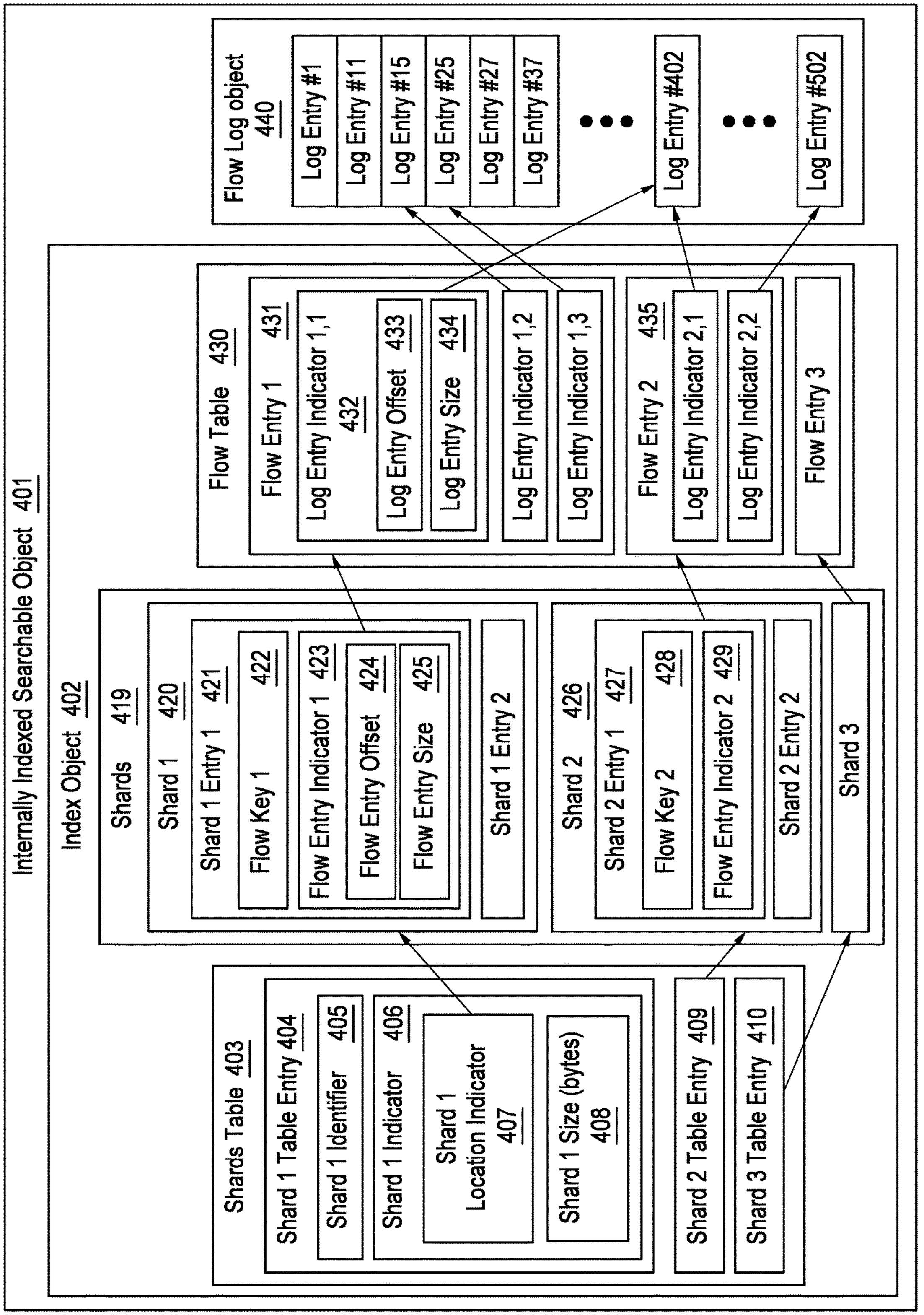
FIG. 4 is a high-level block diagram illustrating an internally indexed searchable object, according to an example.

FIG. 4 is a high-level block diagram illustrating an internally indexed searchable object 401 according to some aspects. The internally indexed searchable object 401 includes an index object 402 and a flow log object 440. The internally indexed searchable object 401 is one example of packaging the flow logs 115 and the metadata 125 illustrated in FIG. 1 that is generated by each network appliance 105 into the same object 401. That is, the index object 402 is one example of the metadata 125 in FIG. 1 while the flow log object 440 is one example of the flow logs 115 in FIG. 1. In one embodiment, the internally indexed searchable object 401 can be a portion of a self-reverse indexed file.

The flow log object 440 includes log entries such as the first log entry 302 illustrated in FIG. 3. The index object 402 includes a shards table 403, shards 419, and a flow table 430. The shards table 403 includes shard table entries such as a first shard table entry 404, a second shard table entry 409, and a third shard table entry 410. The shard table entries store shard indicators, such as the first shard indicator 406, that can indicate the location and size of individual shards. The first shard indicator 406 can include a first shard location 407 and a first shard size 408. An indicator that includes a location and a size can be used for reading the indicated item directly from a memory or a file without searching. The shard indicators may be stored in association with shard identifiers. For example, the first shard indicator 406 may be stored in association with a first shard identifier 405. Embodiments using shard identifiers numbered, for example, from 0 to 63 may simply store the shard indicator for shard N at location N in the table.

Shards 419 includes shards such as a first shard 420, a second shard 426, and a third shard. The shards 419 include shard entries that store flow entry indicators in association with flow keys. The flow entry indicators can indicate the location and size of flow entries in the flow table 430. The first shard's first entry 421 stores a first flow entry indicator 423 in association with a first flow key 422. The second shard's first entry 427 stores a second flow entry indicator 429 in association with a second flow key 428. The first flow entry indicator 423 can include a flow entry offset 424 and a flow entry size 425 that can be used for reading a flow entry from a memory or file. The first flow entry indicator 423 is shown indicating a first flow entry 431. The second flow entry indicator 429 is shown indicating a second flow entry 435.

The flow table 430 includes flow entries such as the first flow entry 431 and the second flow entry 435. The flow entries can indicate log entries in the flow log object 440. The first flow entry 431 includes log entry indicator 1,1 432, log entry indicator 1,2, and log entry indicator 1,3. Log entry indicator 1,1 432 includes a log entry offset 433 and a log entry size 434. The second flow entry 435 includes log entry indicator 2,1, and log entry indicator 2,2. Log entry indicator 1,1 and log entry indicator 2,1 are shown indicating the same log entry.

Figure 5:
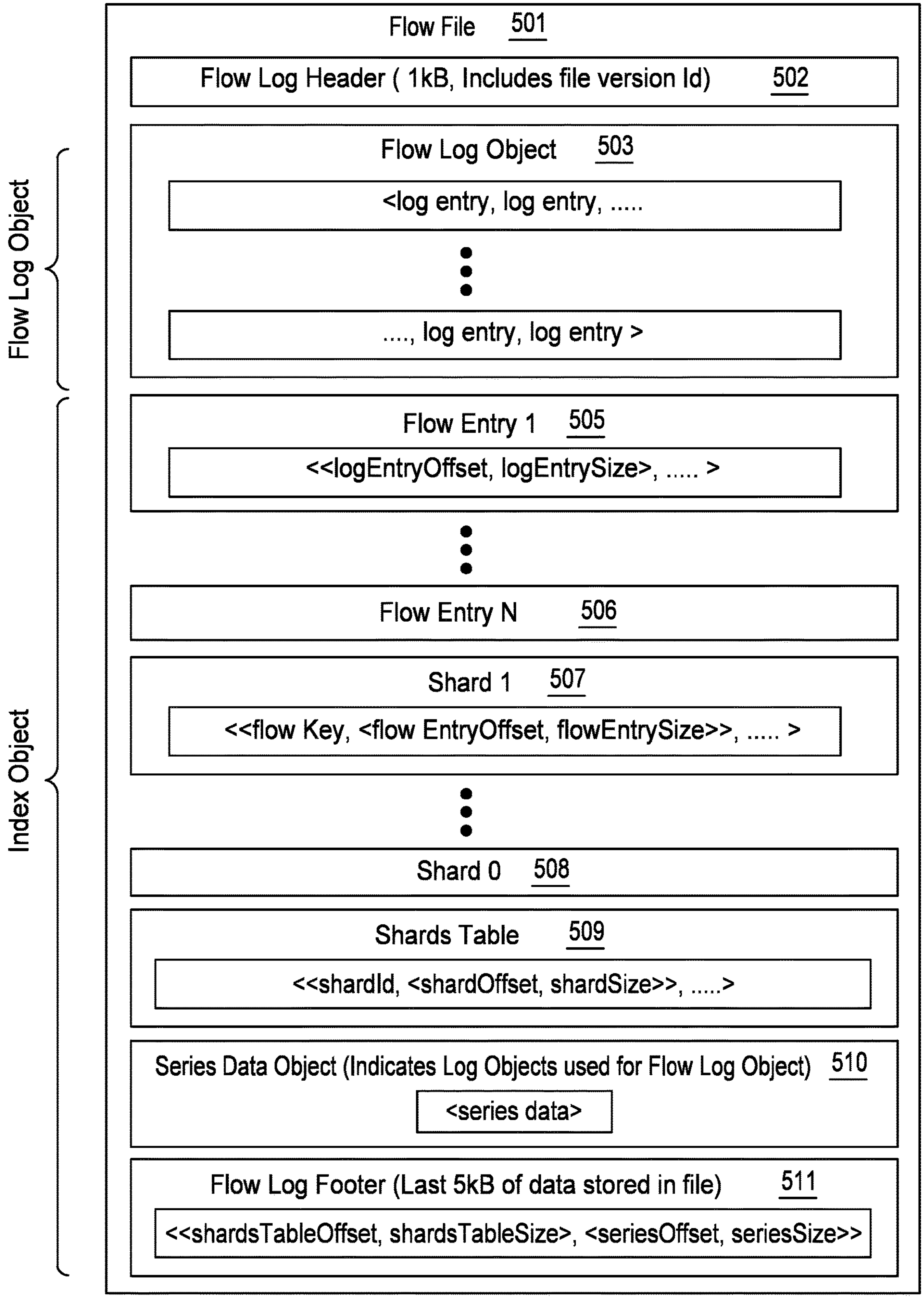
FIG. 5 illustrates a flow file that is an internally searchable object according to some aspects, according to an example.

FIG. 5 illustrates a flow file 501 (e.g., a self-reverse indexed file) that is an internally searchable object according to some aspects. The flow file can be created by sequentially writing data into the file, starting with the flow log header 502. The header can have a fixed size, such as 1 KB and can include a file version identifier. The file version number can be used by programs reading the file for determining if and how to read the file. The flow log object 503 can be stored immediately after the flow log header 502. The flow log object 503 can be the log entries stored one after another. As discussed, the log entries can be stored in a compressed format. The flow entries of the flow table can be stored immediately after the flow log object 503. The flow entries can be stored one after another beginning with the first flow entry 505 and ending with the last flow entry 506. A flow entry can include a number of log entry indicators. The log entry indicators can be log entry offsets paired with log entry sizes. For example, a log entry offset having the value "A" can be paired with the log entry size having the value "B". The corresponding log entry can be read from the flow file 501 by reading "B" bytes beginning at location "A" in the flow file 501. The log entries for a flow entry can be read by stepping through its log entry indicators and reading each log entry in turn.

The shards can be stored immediately after the last flow entry 506 beginning with the first shard 507 and ending with the last shard 508. The shards can be stored as key value pairs. The flowKey can be the key and the log entry indicator can be the value. The log entry indicator can be a flow entry offset and a flow entry size. For example, the flow entry offset can be the value "C" and the flow entry size can be the value "D". The corresponding flow entry can be read from the flow file 501 by reading "D" bytes beginning at location "C" in the flow file 501.

A shards table 509 can be stored immediately after the last shard 508. The shards table can begin with the first shard table entry and end with the last shard table entry. The shard table entries can include a shard offset and a shard size. For example, the shard offset can be the value "E" and the shard size can be the value "F". The corresponding shard can be read from the flow file 501 by reading "F" bytes beginning at location "E" in the flow file 501. The shards table entries can have a known size. For example, each can be eight bytes long and can include a four byte shardOffset and a four byte shardSize. As such, the Nth shard table entry can be read by reading eight bytes beginning at location (N−1)*8 in the shards table.

A series data object 510 can be stored immediately after the shards table. The flow log object 503 contains log entries from one or more specific log objects. The log objects can be stored in the object store and the series data object 510 can indicate where those specific log objects are stored. The series data stored in the series data object could include the fully qualified file names of each of those log objects.

The series object data can be series data that is a copy of the content stored in the series file for the time-period represented by the flow log object. The series data can be stored in both the series file and the flow file 501 for recovery purposes. For example, if the series file gets lost or gets corrupted then the series can be reconstructed by reading the series data from all the flows files.

A flow log footer 511 can be stored immediately after the series data object 510. Flow log footers can all be the same size (e.g., 5 KB) and can contain a shards table indicator and a series data object indicator. The shards table indicator can include a shards table offset and a shards table size. For example, the shards table offset can be the value "G" and the shards table size can be the value "H", The shards table can be read from the flow file 501 by reading "H" bytes beginning at location "G" in the flow file 501.

Log entries in the flow file 501 can be found quickly while reading only the necessary data from the flow file. For example, the entries matching a particular value of an indexed field can be found by determining a flow key and a shard identifier from that value of the indexed field. The flow log footer can be read by reading the tail of the file. The number of bytes to read is known because the size of the footer is known. The shards table can be read using the shards table offset and shards table size from the footer. The shard identifier is used to read, from the shards table, the shard offset and shard size of the shard having the shard identifier. The flow key is used to find a flow entry indicator in the shard. The flow entry indicator indicates a flow entry. The log entry offsets and log entry sizes in the flow entry are used to read the flow entries.

The flow file 501 is illustrated as a file that can be stored in a file system on one or more nonvolatile memory devices such as hard drives, solid state drives, etc. In some implementations, the flow file 501 can be memory mapped. A file can be memory mapped using a system call such as mmap( ) which is a POSIX-compliant Unix system call that maps files or devices into volatile memory such as SDRAM. As such, the contents of the file can be accessed very quickly because the data is already in the system's SDRAM. The flow file 501 is well suited for being memory mapped because the desired data fields can be read directly from the SDRAM using known offsets. In addition, the flow file can be read only and, as such, there is additional efficiency because there is no need to synchronize writes from SDRAM to disk. For example, the flow log footer, which has a known size and position, can be accessed using its known position in the file. The flow log footer 511 gives the location of the shard table (shardsTableOffset) and the size of the shards table (shardTableSize). As such, the shards table can be accessed directly in SDRAM by accessing shardsTableSize bytes beginning at the location shardsTableOffset in the memory mapped file. Flow log objects and index objects, such as those of FIG. 3, may be memory mapped separately and distinctly by, for example, storing them in separate files and memory mapping those files. The shards table location and size parameters, (e.g., shardsTableOffset and shardsTableSize) are illustrated as located at predetermined and specified locations in the footer. The shards table location and size parameters may alternatively be located in the header or in some other location that is predetermined and specified. Furthermore, the data blocks can be ordered differently within the flow file. In fact, the technique of storing data block offsets and data block sizes can be used to intermingle the data blocks.

Figure 6:
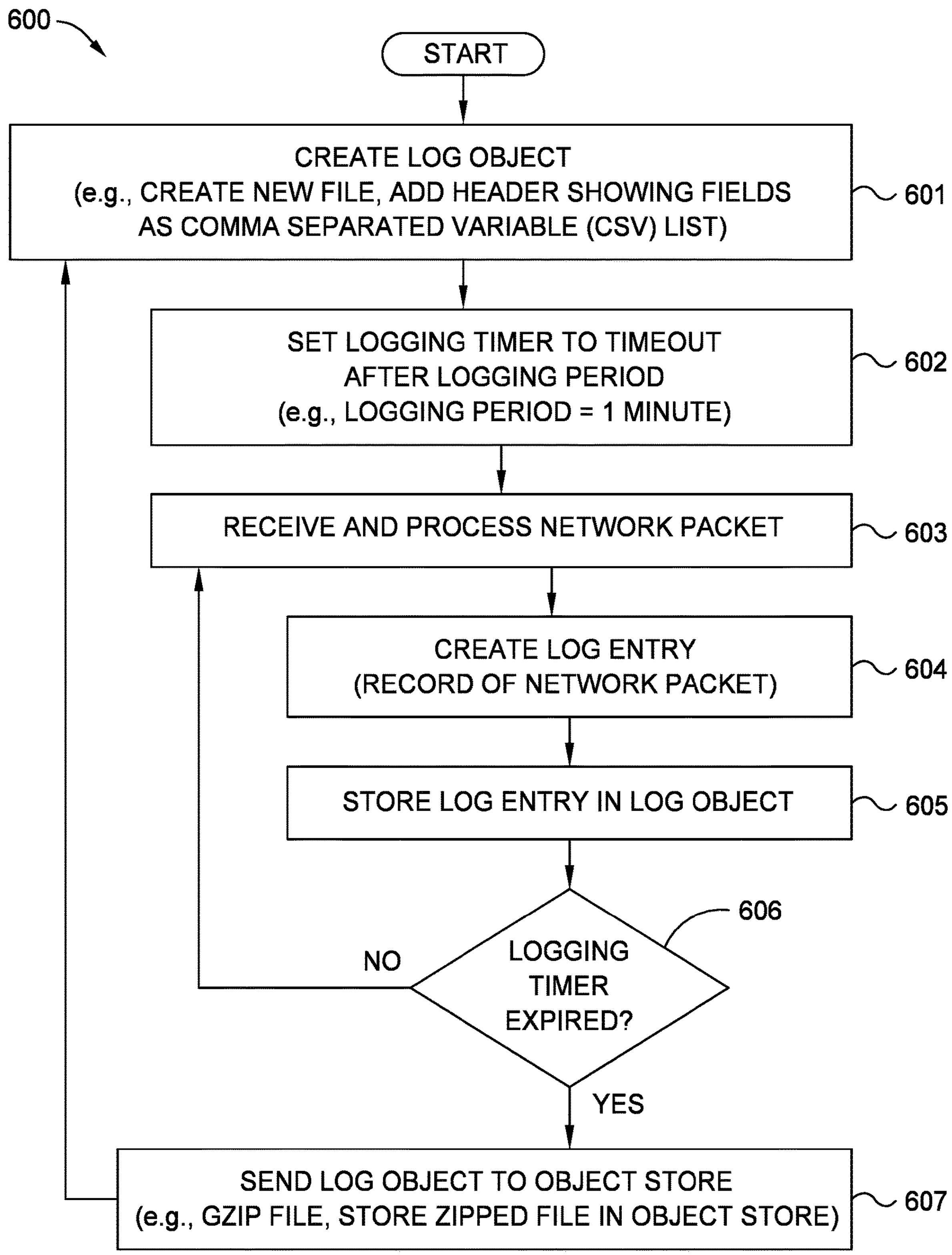
FIG. 6 is a high-level flow diagram illustrating a process that can be implemented by a network appliance to produce log objects, according to an example.

FIG. 6 is a high-level flow diagram illustrating a process 600 that can be implemented by a network appliance to produce log objects (e.g., the log object 301 in FIG. 3) according to some aspects. In one embodiment, the process 600 is performed by the network appliance.

Figure 7:
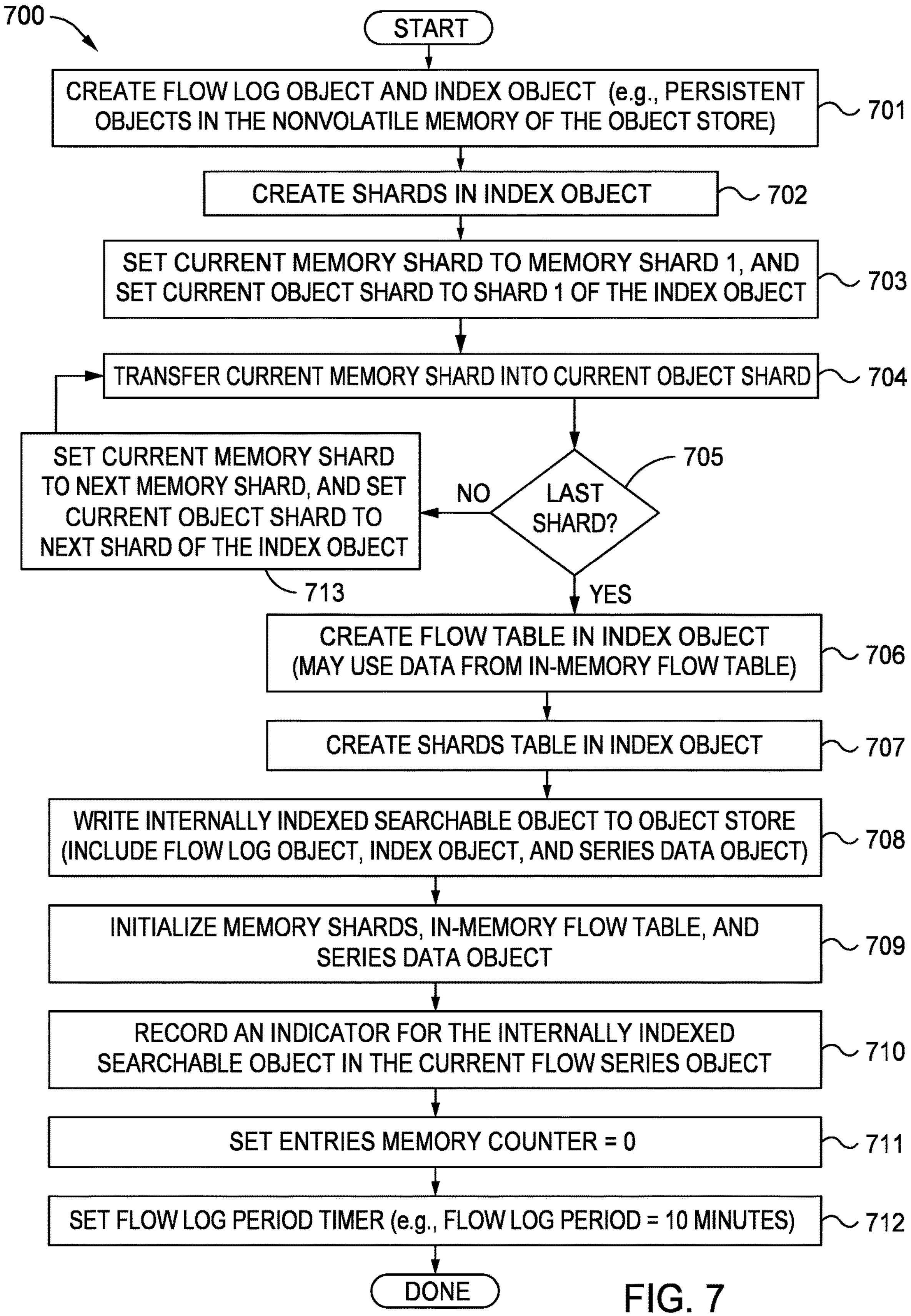
FIG. 7 is a high-level flow diagram of a method illustrating creation of flow log objects and index objects from in-memory data structures, according to an example.

After the start, at block 601 a new log object is created. At block 602, a logging timer can be set. The logging timer can expire after a logging period (e.g., 1 minute) has expired. At block 603, a network packet is received and processed. At block 604, a log entry is created that is a record of the network packet that was received and processed. At block 605, the log entry is stored in the log object. At block 606, the status of the logging timer is checked. If the logging timer has not expired, the process can loop back to block 603. Otherwise, at block 607 the network appliance can send the log object to the object store before looping back to block 601. For example, the network appliance may store the log object in local memory in the DPU (or elsewhere) until the DPU is ready to generate the metadata for the flow logs in the log object FIG. 7 is a high-level flow diagram of a method 700 illustrating creation of flow log objects and index objects from in-memory data structures according to some aspects. The method 700 can be performed by a network appliance (or a DPU in a network appliance).

After the start, at block 701 a flow log object and an index object can be created as persistent objects in the nonvolatile memory of the object store. At block 702, shards can be created in the index object. As discussed above, the index object can have a set number of shards (e.g., 64 shards). At block 703, "current memory shard" is set to the first memory shard and "current object shard" is set to the first shard of the index object, At block 704, the current memory shard is transferred to the current object shard. At block 705, the process can check if the current shard (memory shard or index shard) is the last shard. If not, at block 713 the current memory shard is set to the next memory shard and the current object shard is set to the next shard of the index object before the process loops back to block 704. Otherwise, at block 706 a flow table can be created in the index object. The data in the in-memory flow table may be used to create the flow table. At block 707, a shards table is created in the index object. At block 708, an internally indexed searchable object can be written to the object store. The internally indexed searchable object can include the flow log object, the index object, and the series data object. At block 709, the in-memory shards, in-memory flow table, and the series data object can be initialized. At block 710, an indicator for the internally indexed searchable object can be recorded in the current flow series object. At block 711, the entries memory counter (checked at block 707) is set to 0. At block 712, the flow log period timer is set to time out after a flow log period such as 10 minutes. A 10 minute flow log period and a 6,000,000 max memory entries value can ensure that the in-memory objects are persisted every ten minutes or every six million log entries, whichever occurs first.

Other embodiments of generating the flow logs and metadata for indexing the flow logs is found in U.S. Patent Application 2022/0327123 which is herein incorporated by reference.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network appliance, comprising:

circuitry configured to:

generate flow logs describing operation of the network appliance;

generate metadata that indexes the flow logs, wherein the metadata comprises indices indicating where different types of data are found in the flow logs, wherein the indices in the metadata are self-reverse indices corresponding directly to text in the flow logs that index the flow logs against the text present in the flow logs;

packaging the flow logs with the metadata into a self-reverse indexed binary file; and transmit the self-reverse indexed binary file to a central analyzer configured to merge the self-reverse indexed binary file with one or more other self-reverse indexed binary files received from a plurality of network appliances into a merged self-reverse indexed binary file that is part of a searchable flow log database.

2. The network appliance of claim 1, wherein the indices point to different data fields in the flow logs.

3. The network appliance of claim 1, wherein the flow logs describe operations performed by a firewall executing in the network appliance.

4. The network appliance of claim 1, wherein the circuitry is part of a data processing unit (DPU) in the network appliance.

5. A central analyzer, comprising:

one or more processors; and memory storing an application that is configured to perform an operation, the operation comprising:

receiving a self-reverse indexed binary file from each of a plurality of network appliances, wherein the self-reverse indexed binary files comprise flow logs and metadata, wherein the metadata indexes the flow logs, wherein the metadata comprises indices indicating where different types of data are found in the flow logs, wherein the indices in the metadata are self-reverse indices corresponding directly to text in the flow logs that index the flow logs against the text present in the flow logs;

merging the metadata from each of the self-reverse indexed binary files into a merged self-reverse indexed binary file; and merging the flow logs from each of the self-reverse indexed binary files into the merged self-reverse indexed binary file, wherein the merged self-reverse indexed binary file is part of a searchable flow log database.

6. The central analyzer of claim 5, wherein the indices point to different data fields in the flow logs.

7. The central analyzer of claim 5, wherein the flow logs describe operations performed by a firewall executing in the plurality of network appliances.

8. The central analyzer of claim 5, wherein the flow logs comprises performing a block merge of flow logs received from different ones of the plurality of network appliances.

9. The central analyzer of claim 5, wherein merging the metadata comprises performing a block merge of metadata received from different ones of the plurality of network appliances.

10. A method, comprising:

generating, at a network appliance, flow logs describing operation of the network appliance;

generating, at the network appliance, metadata that indexes the flow logs, wherein the metadata comprises indices indicating where different types of data are found in the flow logs, wherein the indices in the metadata are self-reverse indices corresponding directly to text in the flow logs that index the flow logs against the text present in the flow logs;

packaging the flow logs with the metadata into a self-reverse indexed binary file; and transmitting the self-reverse indexed binary file from the network appliance to a central analyzer that merges the self-reverse indexed binary file with one or more other self-reverse indexed binary files received from a plurality of network appliances into a merged self-reverse indexed binary file that is part of a searchable flow log database.

11. The method of claim 10, wherein the indices point to different data fields in the flow logs.

12. The method of claim 10, wherein the flow logs describe operations performed by a firewall executing in the network appliance.

13. The method of claim 10, wherein metadata is generated by a DPU in the network appliance.

* * * * *